United States Patent [19]

Boisture

[11] Patent Number: 5,169,281
[45] Date of Patent: Dec. 8, 1992

[54] DETACHABLE CRANE- OR BOOM-OPERATED HEAT EXCHANGER TUBE BUNDLE EXTRACTOR

[75] Inventor: Thomas B. Boisture, Baytown, Tex.

[73] Assignee: Ohmstede Mechanical Services, Inc., Baytown, Tex.

[21] Appl. No.: 642,658

[22] Filed: Jan. 17, 1991

[51] Int. Cl.⁵ .......................................... B66F 11/00
[52] U.S. Cl. ............................. 414/745.3; 414/694; 414/724; 414/785; 414/910; 414/663; 29/726.5
[58] Field of Search ...................... 414/745.3, 631, 622, 414/633, 634, 547, 550, 555, 541, 22.55, 23, 659, 663, 912, 910, 718, 728, 740, 735, 690, 694, 785, 408, 687, 723, 724; 165/76, 78; 248/68.1, 125; 187/9 R, 9 E; 29/726.5, 823; 239/165, 172

[56] References Cited

U.S. PATENT DOCUMENTS

| | | | |
|---|---|---|---|
| 2,890,043 | 6/1959 | Bruns | 414/735 X |
| 3,048,280 | 8/1962 | Huff et al. | 29/726.5 |
| 3,112,830 | 12/1963 | Podlesak | 414/23 |
| 3,239,076 | 3/1966 | Huff et al. | 29/726.5 |
| 3,257,001 | 6/1966 | Postlewaite et al. | 29/726.5 |
| 3,335,879 | 8/1967 | Shaffer | 414/541 |
| 3,445,019 | 5/1969 | Stinert | 414/633 |
| 3,515,300 | 6/1970 | Hollenbach | 414/633 |
| 3,567,044 | 3/1971 | Travis | 29/726.5 |
| 3,602,385 | 8/1971 | Wilson | 414/633 |
| 3,608,761 | 9/1971 | Taylor | 414/633 |
| 3,658,191 | 4/1972 | Murphy | 414/745.3 |
| 3,747,789 | 7/1973 | Shipley et al. | 414/633 |
| 3,765,544 | 10/1973 | Murphy | 414/408 |
| 3,786,948 | 1/1974 | Golden | 414/910 X |
| 3,834,566 | 9/1974 | Hilfiker | 414/910 X |
| 3,836,015 | 9/1974 | Travis | 29/726.5 |
| 3,836,025 | 9/1974 | Olson et al. | 414/547 |
| 3,840,128 | 10/1974 | Swoboda et al. | 414/728 |
| 3,908,845 | 9/1975 | Bolt | 414/910 X |
| 3,937,340 | 2/1976 | Grove | 414/740 |
| 3,958,698 | 5/1976 | Van der Woerd | 414/745.3 |
| 3,963,130 | 6/1976 | Maynard | 414/910 X |
| 4,102,463 | 7/1978 | Schmidt | 414/631 |
| 4,199,299 | 4/1980 | Petitto, Sr. et al. | 414/687 |
| 4,274,796 | 6/1981 | Phillips | 414/690 |
| 4,392,524 | 7/1983 | Bauch | 414/745.3 X |
| 4,480,942 | 11/1984 | Farrow | 414/910 X |
| 4,575,305 | 3/1986 | Krajicek et al. | 414/745.3 X |
| 4,652,195 | 3/1987 | McArthur | 414/735 X |
| 4,666,365 | 5/1987 | Cradeur | 414/745.3 |
| 4,676,713 | 6/1987 | Voelpel | 414/735 X |
| 4,718,805 | 1/1988 | Becker | 414/735 X |
| 4,834,604 | 5/1989 | Brittain et al. | 414/22.55 |
| 4,856,545 | 8/1989 | Krajicek et al. | 134/166 C |
| 4,869,638 | 9/1989 | Krajicek et al. | 414/745.3 |
| 4,960,359 | 10/1990 | Lovitt | 414/912 X |

Primary Examiner—Michael S. Huppert
Assistant Examiner—James Keenan
Attorney, Agent, or Firm—Pravel, Gambrell, Hewitt, Kimball & Krieger

[57] ABSTRACT

A heat exchanger tube bundle extractor capable of being used either suspended from a crane or while mounted onto a rigid extendible boom. The extractor features brackets for attaching the extractor to cables suspended from a crane. The extractor can also be mounted onto an extendible boom having an articulated head. When desired, the bundle extractor can be used while mounted onto the boom. If crane operations are preferred, the extractor can be readily detached from the boom and suspended from a crane at much higher elevations.

5 Claims, 5 Drawing Sheets

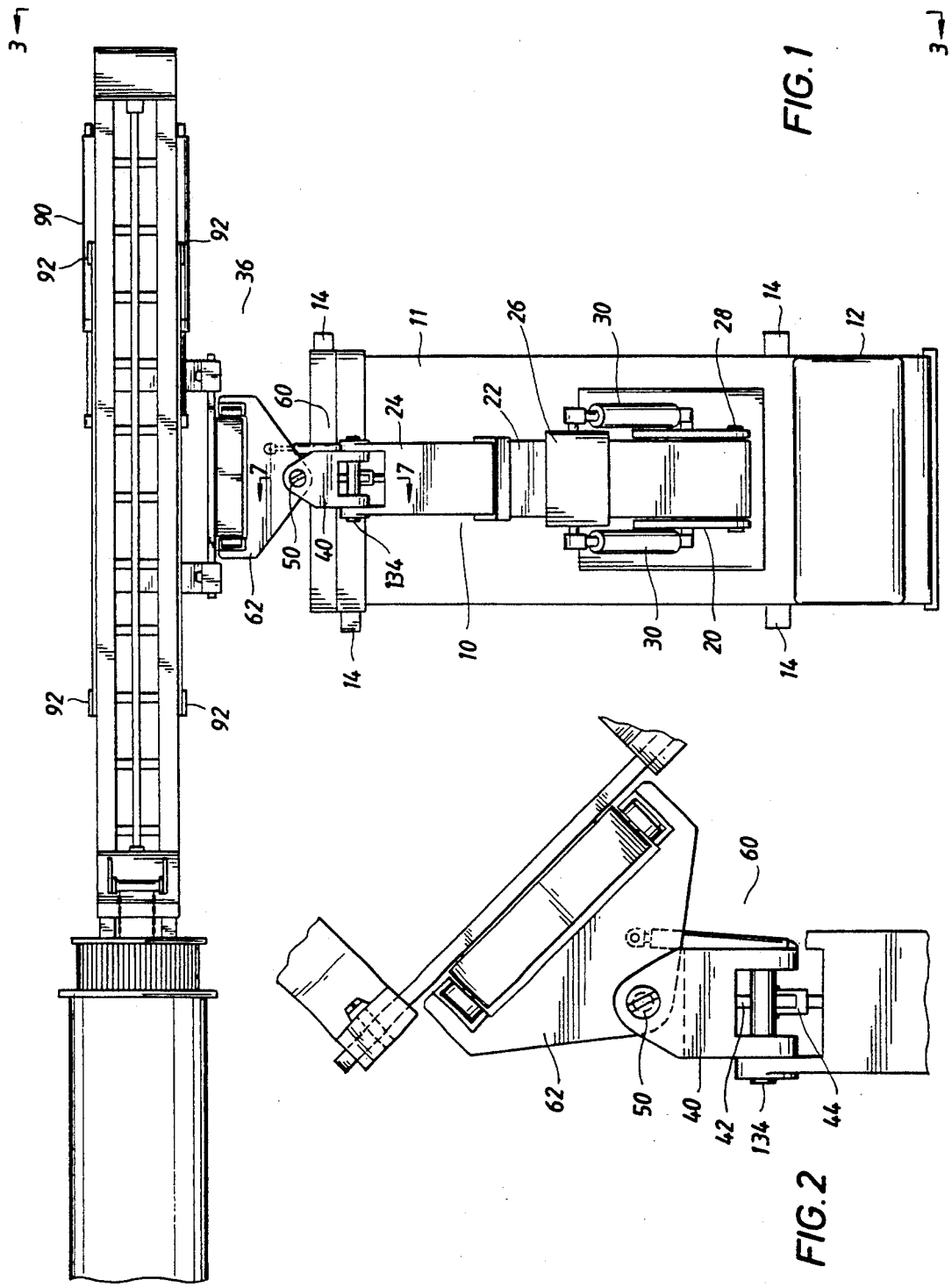

DETACHABLE CRANE- OR BOOM-OPERATED HEAT EXCHANGER TUBE BUNDLE EXTRACTOR

BACKGROUND OF THE INVENTION

1. Field of the Invention

The present invention relates to an apparatus used in conjunction with the cleaning of heat exchanger tubes. More particularly, the present invention relates to an apparatus for the extraction of heat exchanger tube bundles from heat exchange shells, which apparatus is capable of being operated either while mounted on an extendible rigid boom or while being suspended from a crane.

2. Description of the Related Art

Heat exchangers are used for the transfer of heat from one fluid medium to another. One of the fluids passes through a series of conduits, or tubes, while the other passes on the outside of the tubes. During this process, carbonaceous and calcareous deposits form on the interior of the individual tubes. Debris and other dirt collects on the surface of the individual tubes. To maintain efficient operation, it is necessary to periodically remove the tubes and clean their interior and exterior surfaces.

Numerous patents discuss various methods of cleaning the tubes. Exemplary of these are U.S. Pat. Nos. 3,903,912, 3,817,262, 3,901,252, and 4,856,545. Before the tubes can be properly cleaned, it is typically necessary to extract the tube bundle from the shell of the heat exchanger and relocate the bundle at a location more convenient for cleaning. Removal of the tube bundle is desirable in order to facilitate access to both the outside and the inside of the tubes during the cleaning of the tubes. Removal of the tube bundle from the shell is also required in order to allow for the moving of the bundle to a location where the tubes can be cleaned more easily. Heat exchangers are often located in cramped areas and/or above ground level, which makes it inconvenient or even impossible to clean the tubes without relocating the tube bundle to a more accessible location.

Heat exchanger tube bundle extractors typically function by attaching themselves to both the heat exchanger shell and the heat exchanger tube bundle and then pulling the tube bundle out of the shell so as to free the tube bundle and allow it to be transported to a convenient location for cleaning.

Heat exchanger tube bundle extractors are typically mounted in one of two ways. The majority of known extractors are designed to operate while suspended from a crane. In an alternative mode, the extractor can be mounted onto an extendible rigid boom.

Bundle extractors suspended from a crane are disclosed and/or claimed in a number of patents, among them U.S. Pat. Nos. 3,180,498; 3,239,076; 3,567,044; 3,836,015; 4,227,854 and 4,323,398. A bundle extractor mounted onto an extendible rigid vertical boom is disclosed and claimed in U.S. Pat. No. 2,990,072. Rigid extendible booms are generally disclosed in a number of patents, among them U.S. Pat. Nos. 2,990,072, 3,174,634, 3,335,879, 3,836,025, and 4,382,743.

Each of the known heat exchanger bundle extractors is thus designed to either be mounted onto a rigid extendible boom or to be suspended from a crane but not both.

It would be desirable to have a single heat exchanger bundle extractor which is capable of being readily adapted so that it could function either mounted onto a rigid extendible boom or suspended from a crane, at the will of the operator. Having a bundle extractor which can be used in either of these modes increases the operational flexibility of the device and its usefulness. Depending on the circumstances, either of the two modes may be the more convenient and economical in any particular situation.

Accordingly, there exists a need for a heat exchanger tube bundle extractor which features means which renders the tube bundle extractor capable of being used, at the will of the operator, either while mounted onto a rigid extendible boom or while being suspended from a crane.

While there are numerous other disclosures directed to bundle extractors, none discloses or suggests a bundle extractor capable of optionally functioning either mounted onto a rigid extendible boom or suspended from a crane.

SUMMARY OF THE INVENTION

The present invention relates to a detachable heat exchanger tube bundle extractor capable of being used either suspended from a crane or mounted onto a rigid extendible boom. The apparatus features a tube bundle extractor, which can be of various designs, that features means for suspending the apparatus from a crane or similar device while the apparatus is used to pull out, or reinsert, a tube bundle from, or into, the shell of a heat exchanger. The bundle extractor also features means for mounting the extractor onto a rigid extendible boom or similar device. The means for mounting the extractor onto a rigid extendible boom is detachable so that the extractor can be used, at the will of the operator, either suspended from a crane or mounted onto a boom.

BRIEF DESCRIPTION OF THE DRAWINGS

In order to more fully understand the drawings referred to in the detailed description of the present invention, a brief description of each drawing is presented.

FIG. 1 is a top view of an apparatus according to the preferred embodiment, mounted onto a rigid extendible boom;

FIG. 2 is an enlarged top view of a portion of the apparatus of FIG. 1;

DETAILED DESCRIPTION OF THE INVENTION

The present invention is of a detachable heat exchanger tube bundle extracting apparatus which can be used interchangeably in either of two modes. In one mode the apparatus is suspended from a crane. In the other mode the apparatus is mounted onto a rigid extendible boom.

In either mode, the apparatus is used by maneuvering the tube bundle extractor to a location adjoining the heat exchanger whose tube bundle is to be extracted. The extractor is then attached to the tube bundle which is then pulled out of the heat exchanger shell, eventually coming to rest on the extractor. The extractor, with the tube bundle safely secured onto it, is then maneuvered to a location, usually at ground level, where the outside and inside surfaces of the tubes can be conveniently cleaned.

Previously known tube bundle extractors operate in only a single mode. Certain extractors are designed to operate exclusively while suspended from a crane. Other extractors are designed to operate exclusively while mounted onto an extendible rigid boom. The present invention is of an extractor which can be operated in either mode. The decision as to which mode to employ is made by the operator and depends on a variety of job-specific considerations. The decision as to which mode to employ can be made based on various factors including, but not limited to, the availability of a crane or a boom, and the precise location and accessibility of the bundle to be pulled.

Figure 3:
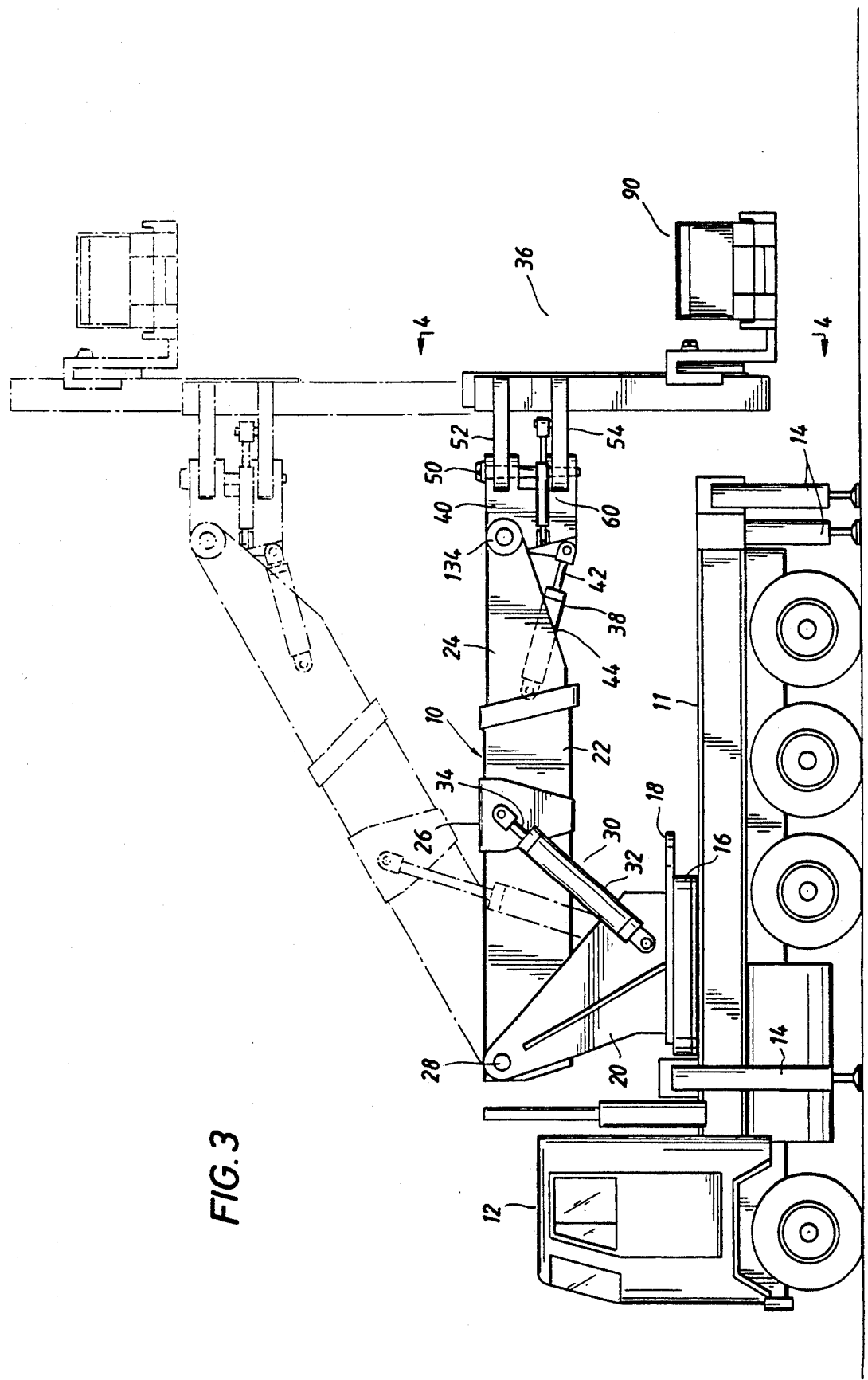
FIG. 3 is an elevational view of the apparatus of FIG. 1 taken along line 3—3 of FIG. 1.
Figure 5:
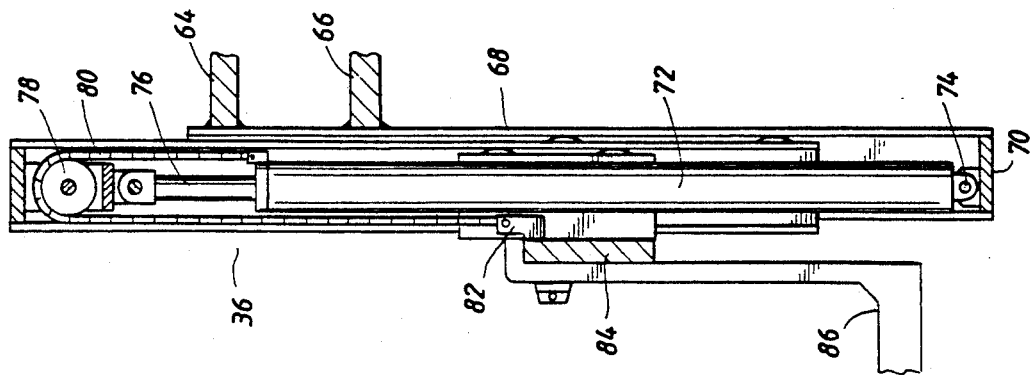
FIG. 5 is a cross-sectional side view of the apparatus of FIG. 1 taken along line 5—5 of FIG. 4.
Figure 4:
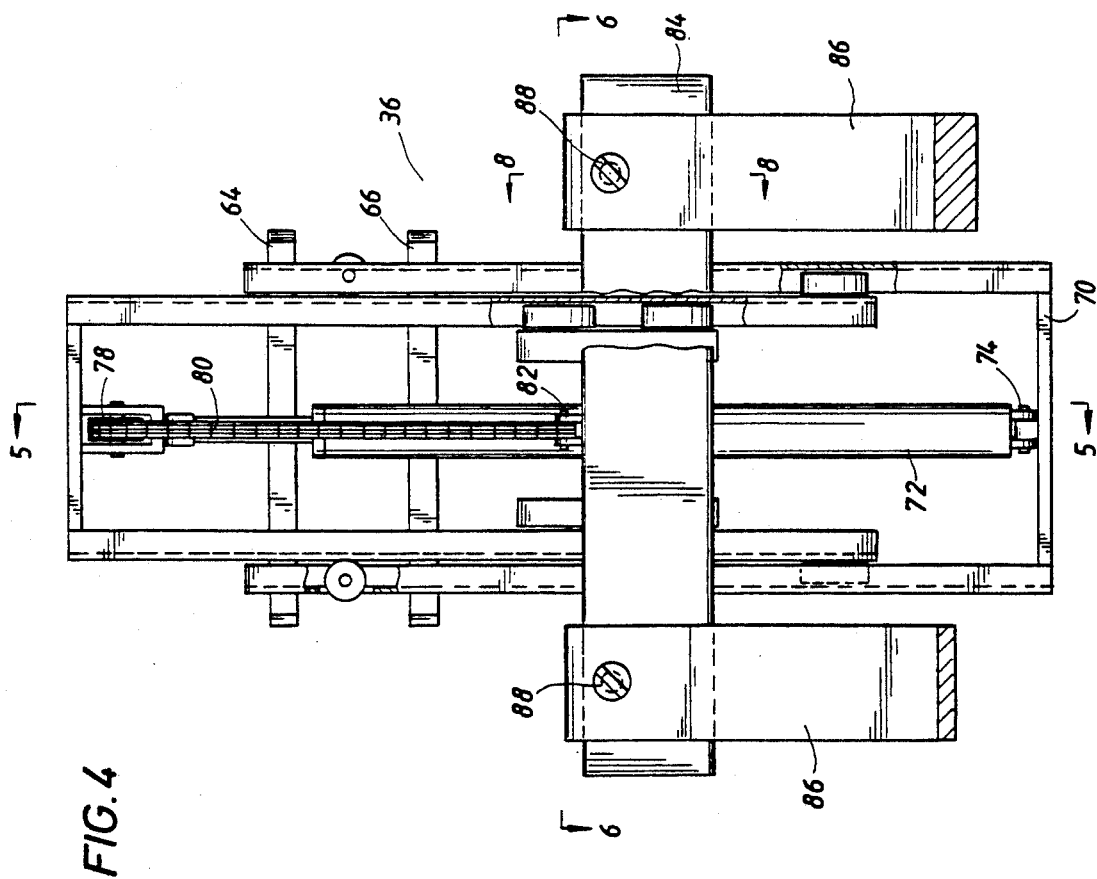
FIG. 4 is a frontal view of the structural cross member assembly portion of the apparatus of FIG. 1 taken along line 4—4 of FIG. 3.
Figure 6:
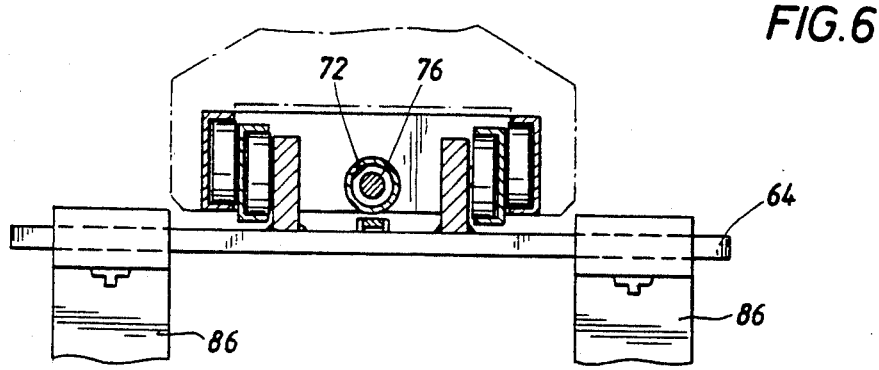
FIG. 6 is a cross-sectional top view of the apparatus of FIG. 1 taken along line 6—6 of FIG. 4.

The apparatus of the present invention can be best understood with reference to the figures. With reference to FIGS. 1 and 3, shown is an extendible rigid boom, designated generally as 10. Boom 10 is mounted on a load carrying platform 11 or similar structure capable of being moved so as to facilitate the location of boom 10 near both heat exchangers and the tube cleaning facilities.

Typically, load carrying platform 11 which supports boom 10 is positioned on a vehicle 12. Vehicle 12 can be any convenient self-propelled vehicle capable of supporting boom 10 as well as the load which boom 10 will be required to bear, including the weight of the tube bundle, and also the forces exerted on boom 10 during the tube bundle extracting process.

Vehicle 12 may be equipped with stabilizing legs 14 to be deployed once the vehicle has been positioned near the tube bundle to be extracted and prior to use of boom 10 in the pulling of the bundle. Stabilizing legs 14 serve to give vehicle 12 added stability during the pulling and transporting operations and enable it to better withstand the large forces which often accompany the pulling of tube bundles.

Rigidly mounted onto platform 11 of vehicle 12 is a stationary turntable receptacle 16, into which fits a rotating turntable member 18. Rotating turntable member 18, in turn, is rigidly attached to a boom lower member 20. This arrangement allows boom 10 to rotate about a vertical axis extending vertically upward from the center of turntable member 18 and facilitates the approach of the bundle extractor to the tube bundle to be pulled.

Mounted onto the upper portion of boom lower member 20 is a boom middle member 22. Boom middle member 22 is so constructed that a portion of a boom upper member 24 fits within the frame of boom middle member 22. Boom upper member 24 can be extended telescopically away from boom middle member 22 so as to effectively increase the length of boom 10.

Boom middle member 22 features a bracket 26 at a convenient point along its length. Boom lower member 20 and boom middle member 22 are connected to each other at the upper portion of boom lower member 20 and at the lower portion of boom middle member 22 through a boom pivot 28. Boom middle member 22 is thus able to rotate about boom pivot 28.

To effectuate the rotation of middle member 22 about boom pivot 28, boom middle member 22 and boom lower member 20 are also connected to each other through a pair of primary hydraulic linkages 30. Primary hydraulic linkages 30 each include a cylinder 32 and a ram 34. One end of each hydraulic linkage 30 is connected to boom lower member 20 at a point near its base. The other end of each hydraulic linkage 30 is connected to bracket 26 which is mounted onto the central portion of boom middle member 22. Primary hydraulic linkage 30 can be used to lift or lower boom middle member 22 as desired.

At the far end of boom upper member 24 is an upper pivot 134 onto which is pivotally mounted a connector assembly 40, onto which is mounted a structural cross member assembly, designated generally as 36.

In addition to being pivotally mounted to boom upper member 24 through upper pivot 134, the connector assembly 40 is also attached to boom upper member 24 through a single connector hydraulic linkage 38. Connector hydraulic linkage 38 includes a cylinder 44 and a ram 42. One end of connector hydraulic linkage 38 is attached to boom upper member 24, while the other end of connector hydraulic linkage 38 is attached to bottom portion of connector assembly 40.

Connector hydraulic linkage 38 is used to tilt connector assembly 40 about upper pivot 134 so as to keep connector linkage 38, and thus structural cross member assembly 36, substantially horizontal as boom 10 is raised and lowered in operation.

Figure 7:
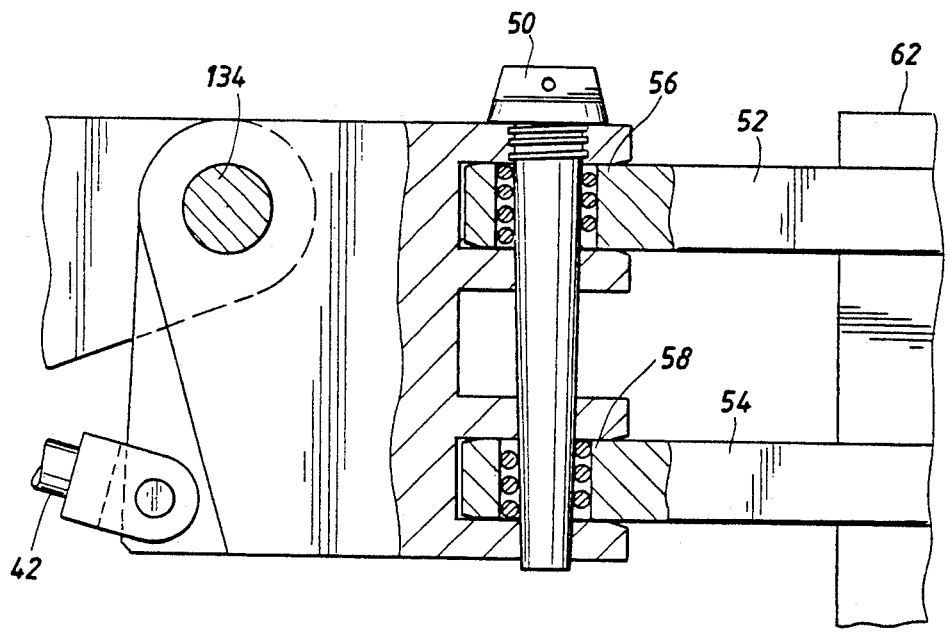
FIG. 7 is a cross-sectional side view of the apparatus of FIG. 1 taken along line 7—7 of FIG. 1.
Figure 8:
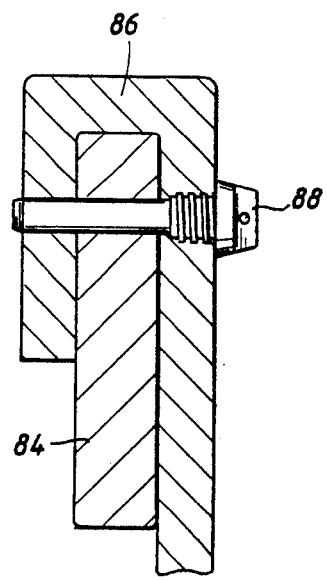
FIG. 8 is a cross-sectional side view of the apparatus of FIG. 1 taken along line 8—8 of FIG. 4.

The structure and function of connector assembly 40 can be better understood in reference to FIGS. 2, 3, and 7. Connector assembly 40 serves to connect boom upper member 24 and structural cross member assembly 36. Connector assembly 40 is connected to boom upper member 24 through upper pivot 134 and through connector hydraulic linkage 38. Connector assembly 40 is attached to structural cross member assembly 36 through a pivot which is secured with a removable vertically oriented tapered threaded nut 50. Nut 50 secures upper and lower arms 52 and 54, respectively, which are permanently attached to structural cross member assembly lift mount 62 which, in turn, is permanently attached to back side of structural cross member assembly 36.

Surrounding nut 50 where it connects with upper and lower arms, 52 and 54, of structural cross member assembly lift mount 62, are upper and lower ball bearing units, 56 and 58, respectively, which serve to facilitate the rotation of connector assembly 40 about nut 50 in a horizontal plane.

To effectuate the controlled rotation of connector assembly 40 about a vertical axis, namely, the centerline of nut 50, a horizontal hydraulic linkage 60 is provided. Horizontal hydraulic linkage 60 is connected at one of its ends to the rear portion of connector assembly 40. At its other end horizontal hydraulic linkage 60 is connected to structural cross member assembly lift mount 62. Horizontal hydraulic linkage 60 is so located as to be capable of rotating structural cross member assembly lift mount 62 so as to render mount 62 perpendicular to boom 10. This degree of rotation facilitates the locating of the apparatus in the appropriate orientation relative to the tube bundle to be pulled and facilitates the transporting of the extracted tube bundle from and to the heat exchanger shell.

The apparatus of the present invention would be used as described herein. Should it be desirable to use the bundle extractor mounted onto a rigid extendible boom or to suspend the extractor from a crane, detachable nut 50 would be removed and horizontal hydraulic linkage 60 would be disengaged. This would serve to detach structural cross member assembly 36 from boom 10 and allow the bundle extractor to be use suspended from a crane.

Structural cross member assembly 36 used in conjunction with the present invention can be of any convenient design and, in its basic elements, is similar to a fork lift carriage normally found as the lifting members of fork lift vehicle commonly used in a variety of lifting and transport operations, e.g., in warehousing operations. Some of the features of structural cross member assembly 36 will be described with reference to FIGS. 4, 5, 6 and 8.

Extending from structural cross member assembly lift mount 62 are upper and lower attachment bars, 64 and 66, respectively. Attachment bars 64 and 66 are permanently attached to structural cross member assembly backplate 68. Backplate 68 is, in turn, permanently connected to a bottom plate 70. Permanently attached to the top surface of bottom plate 70 is a hydraulic lift cylinder 72. Lift cylinder 72 is attached to bottom plate 70 through a pin 74. Exiting cylinder 72 at its upper end is a lift ram 76, onto which is mounted a pulley 78.

Permanently attached to the back portion of cylinder 72 near its top is a chain 80. Chain 80 runs up and over pulley 78 and back down toward the front. The end of chain so toward the front is permanently attached to a bracket 82 which, in turn, is permanently attached to structural cross member assembly lift cross member 84.

Detachably mounted onto lift cross member 84 are one or more structural bars 86. Each structural bar 86 is attached to cross member 84 with the aid of a detachable threaded nut 88. Nut 88 can be used to detach tube bundle extractor 90 from the structural cross member assembly 36. Hydraulic lift cylinder 72 is used to extend or retract lift ram 76. Pulley 78 and chain 80 result in a configuration such that each displacement of ram 76 translates into a movement of cross member 84, and thus, of structural bars 86, which is twice the magnitude of the movement of ram 76.

With reference to FIGS. 1 and 3, it can be seen that structural bars 86 are attached to bundle extractor 90. The attachment is preferably permanent, as by welding. In an alternative embodiment, structural bars 86 are not permanently attached to bundle extractor 90, so that bundle extractor 90 features commonly known means, not shown, for accepting structural bars 86 and for ensuring that extractor 90 is securely mounted onto structural bars 86 and that the bundle pulling apparatus will be able to function safely without danger of disengaging from structural bars 86.

Figure 9:
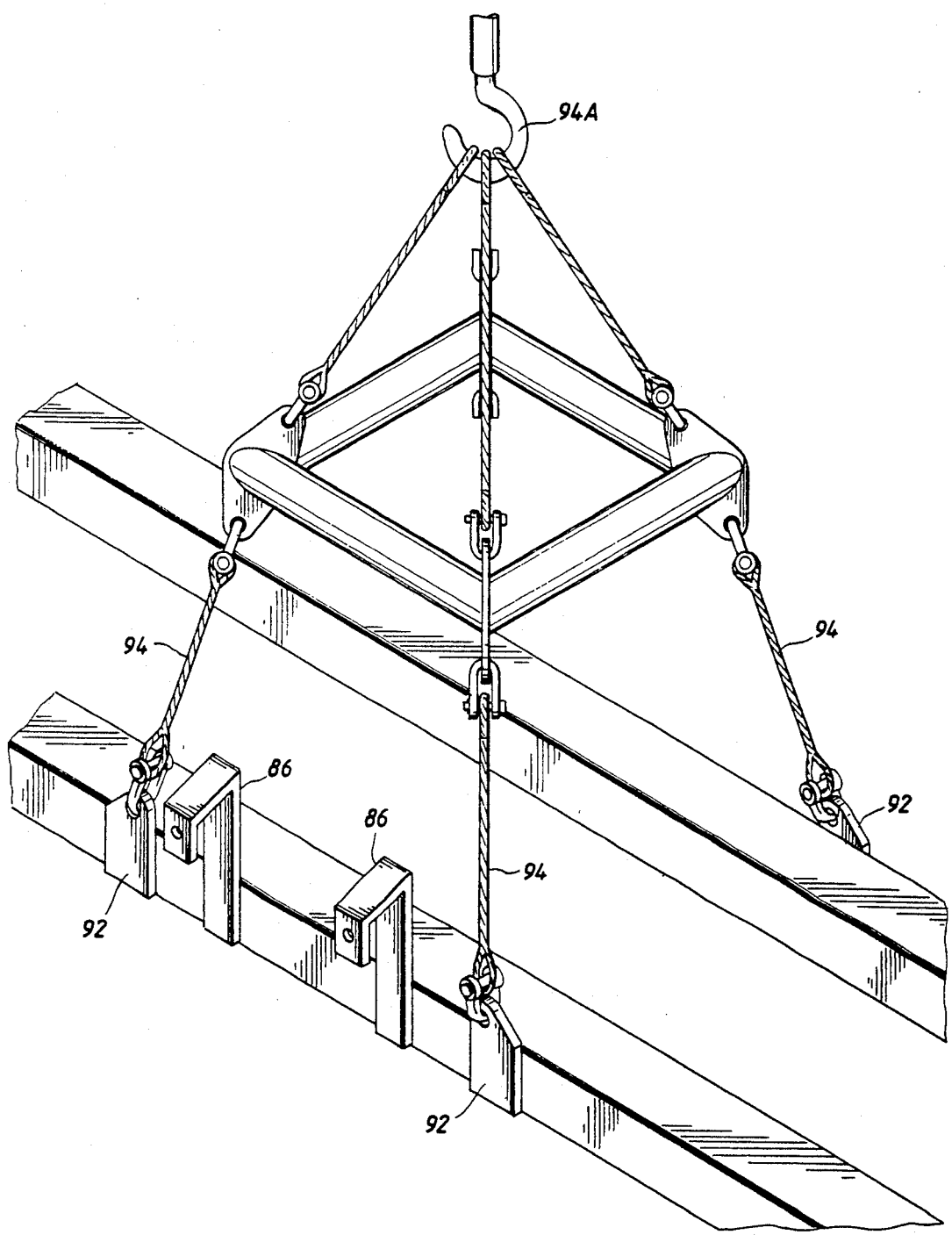
FIG. 9 is a perspective view of a portion of the apparatus of FIG. 1 suspended from a crane.

Bundle extractor 90 also features means for securing extractor 90 to a crane for the purpose of operating extractor 90 in the alternative mode. Many means for suspending a bundle extractor from a crane are known. One illustrative system is shown in FIGS. 1 and 9. Permanently attached to the upper portion of bundle extractor 90 are a number of brackets 92 located so as to properly support the weight of bundle extractor 90.

Attached to brackets 92 are cables 94 which are supported by a crane hook 94A.

Bundle extractor 90 used in conjunction with present invention can be of any convenient design well known to those skilled in the art, including, but not limited to, the large number of designs taught in various patents. Exemplary of such bundle extractors are those taught in U.S. Pat. Nos. 3,180,498, 3,239,076, 3,239,077, 3,257,001, 3,510,012, 3,567,044, 3,836,015, 4,227,854, and 4,323,398.

The descriptions given herein are intended to illustrate the preferred embodiments of the apparatus according to the present invention. It is possible for one skilled in the art to make various changes to the details of the apparatus without departing from the spirit of this invention. Therefore, it is intended that all such variations be included within the scope of the present invention as claimed.

What is claimed is:

1. An apparatus for extracting a heat exchanger tube bundle from a heat exchanger shell, comprising:
    a self-propelled vehicle;
    an extendible boom rotatably mounted to and extending from said self-propelled vehicle; said extendible boom having an extending end;
    a connector assembly pivotably connected to said extending end of said extendible boom;
    a structural cross member assembly pivotably connected to said connector assembly;
    a tube bundle extractor having means for releasably connecting said extractor to said structural cross member assembly and lifting means for suspending said extractor from a crane so that the extractor may be used to extract a tube bundle independent of said self-propelled vehicle.

2. The apparatus according to claim 1, wherein said structural cross member assembly comprises means for adjusting the elevation of said extractor with respect to said connector assembly.

3. The apparatus according to claim 1, wherein said lifting means comprises a plurality of lifting brackets attached to said extractor.

4. An apparatus for extracting a heat exchanger tube bundle from a heat exchanger shell, comprising:
    a self-propelled vehicle;
    an extendible boom rotatably mounted to and extending from said self-propelled vehicle; said extendible boom having an extending end;
    a connector assembly pivotably connected to said extending end of said extendible boom;
    a structural cross member assembly pivotably connected to said connector assembly;
    a tube bundle extractor having means for releasably connecting said extractor to said structural cross member assembly,
    wherein said releasably connecting means comprises a pair of structural bars attached to said tube bundle extractor, each said structural bar having a substantially vertical member and an inverted U upper end to engage said structural cross member assembly.

5. The apparatus according to claim 4, wherein said structural cross member assembly includes a lift cross member,
    said lift cross member and each said structural bar have an opening extending therethrough in axial alignment through which a fastener is inserted to secure said structural bars to said lift cross member.

* * * * *